US012338833B2

(12) United States Patent
Dick et al.

(10) Patent No.: US 12,338,833 B2
(45) Date of Patent: Jun. 24, 2025

(54) RADIAL CONTINUOUS-FLOW MACHINE WITH COOLING AND LUBRICATION BY WAY OF A MEDIUM WHICH FLOWS THROUGH THE MACHINE

(71) Applicant: HELLA GmbH & Co. KGaA, Lippstadt (DE)

(72) Inventors: Georg Dick, Lippstadt (DE); Benjamin Grothe, Wickede (DE); Theodor Hueser, Geseke (DE); Dominik Niess, Selm (DE); Thorsten Wille-Riess, Ense (DE)

(73) Assignee: Hella GmbH & Co. KGaA, Lippstadt (DE)

(*) Notice: Subject to any disclaimer, the term of this patent is extended or adjusted under 35 U.S.C. 154(b) by 69 days.

(21) Appl. No.: 18/227,684

(22) Filed: Jul. 28, 2023

(65) Prior Publication Data

US 2023/0366410 A1 Nov. 16, 2023

Related U.S. Application Data

(63) Continuation of application No. PCT/EP2022/050727, filed on Jan. 14, 2022.

(30) Foreign Application Priority Data

Jan. 29, 2021 (DE) ..................... 10 2021 102 149.9

(51) Int. Cl.

| | |
|---|---|
| ***F04D 29/06*** | (2006.01) |
| ***F04D 13/06*** | (2006.01) |
| ***F04D 29/58*** | (2006.01) |

(52) U.S. Cl.

CPC ....... *F04D 29/061* (2013.01); *F04D 13/0633* (2013.01); *F04D 13/0646* (2013.01);

(Continued)

(58) Field of Classification Search

CPC .. F04D 13/06; F04D 13/0633; F04D 13/0646; F04D 13/0653; F04D 29/061;

(Continued)

(56) References Cited

U.S. PATENT DOCUMENTS 3,288,073 A * 11/1966 Pezzillo ............. F04D 13/0613 415/110
4,869,654 A 9/1989 Klaus (Continued)

FOREIGN PATENT DOCUMENTS

DE 2618593 A1 11/1977
DE 3715484 A1 11/1988

(Continued)

OTHER PUBLICATIONS

International Search Report dated Apr. 22, 2022 in corresponding application PCT/EP2022/050727.

*Primary Examiner* — Essama Omgba
*Assistant Examiner* — Joseph S. Herrmann
(74) *Attorney, Agent, or Firm* — Muncy, Geissler, Olds & Lowe, P.C.

(57) ABSTRACT

A radial continuous-flow machine with cooling and lubrication by means of a medium flowing through the machine, wherein the medium flows from a high-pressure side to a low-pressure side of the radial continuous-flow machine, having a housing assembly and a rotor assembly that is rotatably mounted in an interior of the housing assembly, wherein at least one first bearing is provided for mounting the rotor assembly in the housing assembly, wherein the rotor assembly includes a rotor of an electric motor and an impeller, wherein the motor includes, in addition to the rotor, a stator that is a part of the housing assembly, wherein the rotor of the motor is arranged in a first region of the rotor assembly, and the stator is arranged in a first region of the (Continued)

housing assembly, wherein the first region of the housing assembly encloses the first region of the rotor assembly.

11 Claims, 1 Drawing Sheet

(52) U.S. Cl.
CPC ..... *F04D 13/0653* (2013.01); *F04D 29/5806* (2013.01); *F04D 29/588* (2013.01); *F04D 13/06* (2013.01); *F05D 2260/232* (2013.01); *F05D 2260/98* (2013.01)

(58) Field of Classification Search
CPC .. F04D 29/5806; F04D 29/588; F04D 29/047; F05D 2260/232; F05D 2260/98; H02K 9/193; H02K 9/197
USPC .......................................................... 417/386
See application file for complete search history.

(56) References Cited

U.S. PATENT DOCUMENTS

| | | | | |
|---|---|---|---|---|
| 4,890,988 | A | 1/1990 | Kraemer et al. | |
| 5,397,220 | A * | 3/1995 | Akihisa | F04D 29/061 417/DIG. 1 |
| 6,012,909 | A * | 1/2000 | Sloteman | H02K 5/1282 417/370 |
| 2003/0024386 | A1 * | 2/2003 | Burke | F16J 15/56 92/240 |
| 2013/0216355 | A1 | 8/2013 | Park et al. | |
| 2020/0300250 | A1 | 9/2020 | Torii et al. | |

FOREIGN PATENT DOCUMENTS

| | | | |
|---|---|---|---|
| DE | 102016100535 | A1 | 6/2017 |
| EP | 1775478 | A2 | 4/2007 |

* cited by examiner

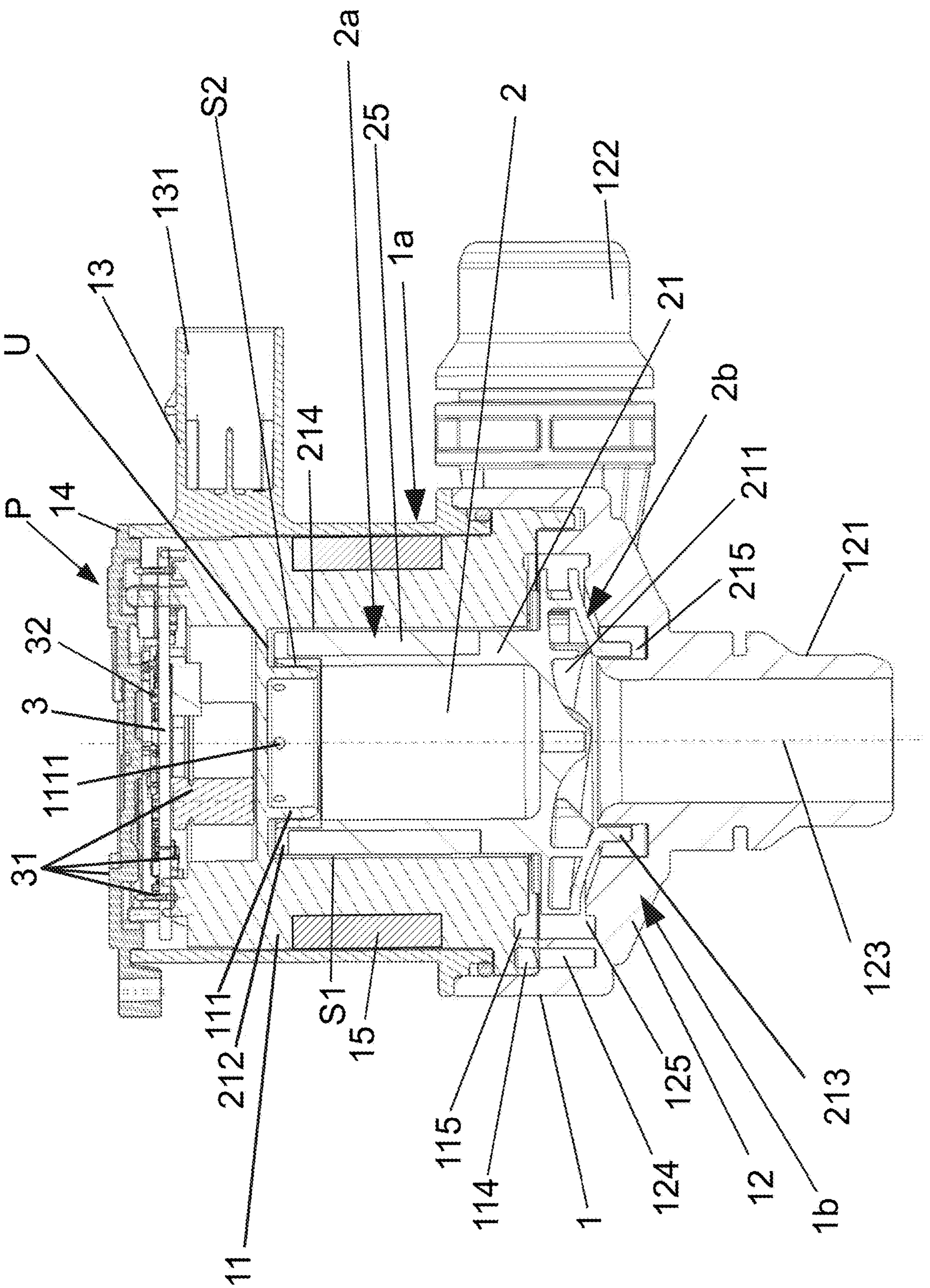
2a
S2
25
2
131
122
1a
13
U
21
214
2b
P
14
211
215
121
32
3
1111
31
123
111
212
S1
15
125
213
115
114
124
12
1b
1
11

RADIAL CONTINUOUS-FLOW MACHINE WITH COOLING AND LUBRICATION BY WAY OF A MEDIUM WHICH FLOWS THROUGH THE MACHINE

This nonprovisional application is a continuation of International Application No PCT/EP2022/050727, which was filed on Jan. 14, 2022, and which claims priority to German Patent Application No 10 2021 102 149.9, which was filed in Germany on Jan. 29, 2021, and which are both herein incorporated by reference.

BACKGROUND OF THE INVENTION

Field of the Invention

The invention relates to a radial continuous-flow machine, in particular a driven radial-flow machine, for example a radial-flow pump, with cooling and lubrication by means of a medium flowing through the machine, wherein the medium flows from a high-pressure side to a low-pressure side of the radial continuous-flow machine, having a housing assembly and a rotor assembly that is rotatably mounted in an interior of the housing assembly, wherein at least one first bearing is provided for mounting the rotor assembly in the housing assembly, wherein the rotor assembly includes a rotor of an electric motor and an impeller, wherein the motor includes, in addition to the rotor, a stator that is a part of the housing assembly, wherein the rotor of the motor is arranged in a first region of the rotor assembly, and the stator is arranged in a first region of the housing assembly, wherein the first region of the housing assembly encloses the first region of the rotor assembly, wherein a distance that forms a first gap is provided between the first region of the housing assembly and the first region of the rotor assembly, which gap is connected on one side to the high-pressure side and on another side to the low-pressure side of the radial continuous-flow machine, so that a bypass flow of the medium flowing through the radial continuous-flow machine flows through the first gap during operation of the radial continuous-flow machine, and in so doing carries away heat from the rotor and/or the stator of the motor, wherein the first bearing has a second gap that is provided between a first bearing part of the rotor assembly and a first bearing part of the housing assembly, wherein the first gap is connected on the low-pressure side or on the high-pressure side to the second gap, so that a part of the medium flowing through the radial continuous-flow machine flows through the second gap during operation of the radial continuous-flow machine, and in so doing provides for lubrication of the bearing.

Description of the Background Art

Radial continuous-flow machines, in particular such radial-flow pumps, are known to the inventors. They have the advantage that the motor is cooled, and the first bearing is partially lubricated with the aid of the bypass flow flowing through the first gap. If the bypass flow is subsequently routed through the second gap as well, complete lubrication of the first bearing is possible.

If the bypass flow of the medium is routed from the first gap to the second gap, it passes through a region of transition from the first to the second gap. In this region, the bypass flow can be redirected.

Particles that are carried along by the bypass flow can be deposited and accumulate in the first bearing. This can occur, for example, because zones arise in the transition region between the first gap and the second gap in which the flow velocity of the medium is low. The bypass flow can be decreased by deposited particles. This can adversely affect both the cooling of the motor and the lubrication of the first bearing. The deposition of particles should therefore be avoided.

SUMMARY OF THE INVENTION

It is therefore an object of the invention to avoid the deposition of particles in the first bearing.

This object is attained according to the invention by the means that bypass orifices or bypass passages are provided in a region of the transition from the first gap to the second gap that connect this region of the transition to the low-pressure side of the radial continuous-flow machine so that only a part of the medium flowing through the first gap also flows through the second gap during operation of the radial continuous-flow machine. Preferably, the greater part of the bypass flow is routed through the bypass orifices or bypass passages. This greater part of the bypass flow then carries along the particles entrained in the bypass flow so that they cannot be deposited in the first bearing. Preferably, the connection of the bypass orifices or bypass passages to the transition region is designed such that the part of the bypass flow routed through the bypass orifices or bypass passages is diverted less often than in the prior art so that fewer zones of low flow velocity can arise in the first bearing as a result. Moreover, the bypass orifices or bypass passages preferably have a cross section that offers a lower resistance to the part of the bypass flow than the second gap, so that the part of the bypass flow flowing through the bypass orifices or bypass passages is greater than the part of the bypass flow flowing through the second gap.

In this way, it is possible that each bypass orifice or each bypass passage has a minimal cross section, and that a length and a width or a diameter of at least one of these minimal cross sections is greater than the distance between the first region of the housing assembly and the first region of the rotor assembly in the region of the second gap.

Furthermore, it is possible that the sum of the minimal cross sections of the bypass orifices or bypass passages is greater than the minimal cross section of the second gap.

In a radial continuous-flow machine according to the invention, the first bearing part of the housing assembly can be composed of an annular groove. The first bearing part of the rotor assembly can be composed of a first ring that projects into the annular groove and is a part of the rotor assembly.

A part of the first gap can be formed between a radially outer boundary surface of the annular groove and a radially outer surface of the first ring. The second gap can be formed between a radially inner boundary surface of the annular groove and a radially inner surface of the first ring. The region of the transition from the first gap to the second gap can be formed between an axial boundary surface of the annular groove and an axial surface of the first ring.

In a radial continuous-flow machine according to the invention, the radially inner boundary surface of the annular groove can be a radially outer surface of a second ring that is a part of the housing assembly. The bypass orifices or bypass passages that connect the region of the transition from the first gap to the second gap to the low-pressure side of the radial continuous-flow machine can be provided in the second ring. The bypass orifices or bypass passages can be, in particular, through-holes that extend radially in the second ring.

The first bearing can be a radial plain bearing. A bearing sleeve of this plain bearing can be a part of the rotor assembly.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus, are not limitive of the present invention, and wherein the sole FIGURE shows a longitudinal section through a radial-flow pump according to the invention.

DETAILED DESCRIPTION

The radial-flow pump P shown has a housing assembly 1, a rotor assembly 2, and a control assembly 3.

The housing assembly 1 has a first housing part 11, a second housing part 12, a cover 13, a cap 14, and a stator 15 of an electric motor 15, 25 of the radial-flow pump P.

The first housing part 11 and the second housing part 12 surround a first housing interior, in which the rotor assembly 2 is rotatably arranged by means of a first bearing (that includes first annular groove 214 and first ring 212) and a second bearing (that includes second annular groove 215 and second ring 213). The first housing interior has a first region, which is enclosed by a first region 1*a* of the housing assembly 1. Arranged in this first region 1*a* of the housing assembly 1 is a first region 2*a* of the rotor assembly. Arranged in a second region of the housing interior, which is enclosed by a second region 1*b* of the housing assembly 1, is a second region 2*b* of the rotor assembly 2.

The first region 1*a* of the housing assembly is composed of the stator 15 and a part of the first housing part 11 in which the stator 15 is arranged in an outer, circumferential recess. Formed in this first region 1*a* is the first annular groove 214 that forms a first bearing part of the housing assembly 1, such that the first annular groove 214 constitutes a part of the first bearing. The first annular groove 214 is formed in a wall of the first housing part 11 located in an axial direction. Rolling elements or other bearing elements that facilitate a rotation can be arranged in the first annular groove 214. The first annular groove 214 is provided between a radially inner wall of the first region 1*a* of the housing assembly and a ring 111.

The second region 1*b* of the housing assembly is composed essentially of a part of the second housing part 12 and only to a small degree of the first housing part 11. Formed in this second region 1*b* is the second annular groove 215 that forms a second bearing part of the housing assembly 1, such that the second annular groove 215 constitutes a part of the second bearing. The second annular groove 215 is formed in a wall of the second housing part 12 located in an axial direction. Rolling elements or other bearing elements that facilitate a rotation can be arranged in the second annular groove 215. The first annular groove 214 and the second annular groove 215 are located on opposite sides of the first housing interior.

The second housing part 12 has an intake connection 121 on the low-pressure side and a discharge connection 122 on the high-pressure side, by which means the medium delivered by the radial-flow pump P can flow into the first housing interior and out of the first housing interior. The intake connection 121 is connected to the first housing interior by an intake passage 123. The first housing interior is connected to the discharge connection 122 by discharge passages 114, 124, 115, 125. The discharge passages 114, 124, 115, 125 in this case are composed of grooves 114, 115 in the first housing part 11 and of grooves 124, 125 in the second housing part 12.

The rotor 2 has two component parts, namely an impeller 21 and a rotor 25 of the electric motor 15, 25. The impeller 21 is a hollow shaft whose ends form rings 212, 213 that are rotatably arranged in the first annular groove 214 or in the second annular groove 215 of the housing assembly 1. The first ring 212 of the impeller, that projects into the first annular groove 214, forms a first bearing part of the rotor assembly 2, and the second ring 213 of the impeller, that projects into the second annular groove 215, forms a second bearing part of the rotor assembly 2. The first ring 212 together with the first annular groove 214 forms the first bearing and the second ring 213 together with the second annular groove 215 forms the second bearing.

The first region 2*a* of the rotor assembly has the rotor 25 of the motor 15, 25. The rotor 25 is recessed in an outer circumference of the impeller 21.

The second region 2*b* of the rotor assembly 2 includes the impeller 21 with impeller blades 211. The intake passage 123 opens into the center of the impeller 21 between the impeller blades 211. It forms a low-pressure side of the radial-flow pump P.

Owing to the rotation of the rotor assembly 2, and thus of the impeller blades 211, the inflowing medium is forced into the discharge passages 114, 124, 115, 125. The pressure of the medium is increased as a result. The discharge passages 114, 124, 115, 125 are arranged on a high-pressure side of the radial-flow pump P.

Between the first region 2*a* of the rotor assembly 2, including the first ring 212, and the first region 1*a* of the housing assembly 1, a first gap S1 that extends into the first annular groove 214 is provided between a radially outer surface of the first region 2*a* of the rotor assembly 2 and a radially inner surface of the first region 1*a* of the housing assembly 1. On the side opposite the first annular groove 214, the first gap S1 is connected to the high-pressure side of the radial-flow pump P, namely to at least one of the discharge passages 114, 124, 115, 125.

Formed between a radially inner surface of the first ring 212 and a radially inner boundary surface of the first annular groove 214 is a second gap S2. The radially inner boundary surface of the first annular groove 214 is a radially outer surface of the ring 111 that is a part of the housing assembly and projects from the wall of the first housing part 11 located in an axial direction. On the side opposite the first annular groove 214, the second gap S2 is connected through a hollow space in the impeller 21 to the low-pressure side of the radial-flow pump P, namely the center between the impeller blades 211.

A transition region U that connects the two gaps S1, S2 is provided between the first gap S1 and the second gap S2.

This transition region U is formed between an axial boundary surface of the first annular groove 214 and an axial surface of the first ring 212.

It is not solely through the second gap S2 that the transition region U is connected to the low-pressure side of the radial-flow pump P. Instead, bypass passages 1111 are provided in the ring 111 of the first housing part that connect the transition region U to the low-pressure side of the radial-flow pump P through the interior of the impeller 21. The bypass passages 1111 have a cross section that is greater than the second gap S2.

The control assembly 3 is arranged in the second housing interior, which is surrounded by a part of the second housing part 12, the cover 13, and the cap 14.

The control assembly 3 has a circuit board 31, on which various electrical components 32 are arranged. These electrical components 32 and conductive traces on the circuit board 31 form an electrical circuit with which the motor 15, 25 is controlled and supplied with power. The radial-flow pump P has a plug connector 131 which is an integral part of the cover 13. Electrical contacts of the plug connector 131 are connected to the circuit.

During operation of the radial-flow pump P, the impeller 21 is driven and in this way the inflowing medium is pumped to the discharge connection 122. At the high-pressure side, a bypass flow is branched off from the pumped medium and is routed through the first gap S1. This bypass flow provides for a cooling of the electric motor 15, 25. The bypass flow flows through the transition region U. From the transition region U, a smaller part flows through the second gap S2, where it provides for lubrication in the first bearing. A greater part of the bypass flow flows through the bypass passages 1111, past the second gap S2, to the low-pressure side. This greater part of the bypass flow travels along with particles that are transported in the bypass flow, thereby preventing them from being deposited in the transition region U or in the second gap S2 and thus causing damage to the bearing.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A radial continuous-flow machine with cooling and lubrication via a medium flowing through the machine, the medium flowing from a high-pressure side to a low-pressure side of the radial continuous-flow machine, the radial continuous-flow machine comprising:

a housing assembly; and a rotor assembly that is rotatably mounted in an interior of the housing assembly, the rotor assembly including a rotor of an electric motor and an impeller;

at least one first bearing to mount the rotor assembly in the housing assembly, the at least one bearing including a first bearing; and bypass orifices or bypass passages, wherein the electric motor further includes a stator that is a part of the housing assembly, wherein the rotor of the electric motor is arranged in a first region of the rotor assembly, and the stator is arranged in a first region of the housing assembly, wherein the first region of the housing assembly encloses the first region of the rotor assembly, wherein a distance that forms a first gap is provided between the first region of the housing assembly and the first region of the rotor assembly, where the first gap is connected on one side to the high-pressure side and on another side to the low-pressure side, so that a bypass flow of the medium flowing through the radial continuous-flow machine flows through the first gap during operation of the radial continuous-flow machine, and in so doing carries away heat from the rotor and/or the stator of the electric motor, wherein a second gap is provided between a first bearing part of the rotor assembly and a first bearing part of the housing assembly, wherein the first gap is connected on the low-pressure side or on the high-pressure side to the second gap so that a part of the medium flowing through the radial continuous-flow machine flows through the second gap during the operation of the radial continuous-flow machine, such that the part of the medium flowing through the radial continuous-flow machine provides for lubrication of the first bearing, wherein the bypass orifices or the bypass passages are provided in a transition region from the first gap to the second gap, the bypass orifices or the bypass passages connecting the transition region to the low-pressure side of the radial continuous-flow machine, so that only a part of the medium flowing through the first gap is the part of the medium flowing through the second gap during the operation of the radial continuous-flow machine, wherein the first bearing part of the housing assembly is composed of a first annular groove, and wherein the first bearing part of the rotor assembly is composed of a first ring that projects into the first annular groove and is a part of the rotor assembly.

2. The radial continuous-flow machine according to claim 1, wherein a length and a width or a diameter at a smallest cross section of each bypass orifice or each bypass passage is greater than the distance between the first region of the housing assembly and the first region of the rotor assembly in a region of the second gap.

3. The radial continuous-flow machine according to claim 2, wherein a sum of each of the smallest cross sections of the bypass orifices or each of the smallest cross sections of the bypass passages is greater than a smallest cross section of the second gap.

4. The radial continuous-flow machine according to claim 1, wherein a part of the first gap is formed between a radially outer boundary surface of the first annular groove and a radially outer surface of the first ring.

5. The radial continuous-flow machine according to claim 1, wherein the second gap is formed between a radially inner boundary surface of the first annular groove and a radially inner surface of the first ring.

6. The radial continuous-flow machine according to claim 5, wherein the radially inner boundary surface of the first annular groove is a radially outer surface of a ring that is a part of the housing assembly.

7. The radial continuous-flow machine according to claim 6, wherein the bypass orifices or the bypass passages, in the transition region from the first gap to the second gap, are provided in the ring of the housing assembly.

8. The radial continuous-flow machine according to claim 7, wherein the bypass orifices or the bypass passages are through-holes that extend radially in the ring of the housing assembly.

9. The radial continuous-flow machine according to claim 1, wherein the transition region from the first gap to the second gap is formed between an axial boundary surface of the first annular groove and an axial surface of the first ring.

10. The radial continuous-flow machine according to claim 1, wherein the radial continuous-flow machine is a driven radial-flow machine or a radial-flow pump.

11. The radial continuous-flow machine according to claim 1, wherein the bypass orifices or the bypass passages are sized so that a part of the medium flowing through the bypass orifices or the bypass passages is greater than the part of the medium flowing through the second gap during the operation of the radial continuous-flow machine.

* * * * *